United States Patent [19]

Mase

[11] Patent Number: 4,498,517
[45] Date of Patent: Feb. 12, 1985

[54] BRAKING DEVICE FOR USE IN A ROLLER BLIND

[75] Inventor: Ryoichi Mase, Tokyo, Japan

[73] Assignee: Toso Kabushiki Kaisha, Tokyo, Japan

[21] Appl. No.: 466,499

[22] Filed: Feb. 15, 1983

[30] Foreign Application Priority Data

Feb. 19, 1982 [JP] Japan .................. 57-024514

[51] Int. Cl.³ .............................. E06B 9/208
[52] U.S. Cl. ..................... 160/294; 160/299
[58] Field of Search .................. 160/291–299

[56] References Cited

U.S. PATENT DOCUMENTS 1,783,002 11/1930 Simpson ............................ 160/298
2,025,656 12/1935 Fehan ............................... 160/298
4,424,851  1/1984 Kohayakawa ..................... 160/298

FOREIGN PATENT DOCUMENTS 238426 8/1925 United Kingdom ............... 160/299

Primary Examiner—Peter M. Caun
Attorney, Agent, or Firm—Birch, Stewart, Kolasch & Birch

[57] ABSTRACT

A braking device for use in a spring-motor type roller blind comprising cam and brake means interposed between a rotatable tube and a fixed shaft in substitution for a centrifugal clutch. The means has a brake drum mounted on the fixed shaft, a coil spring brake mounted on the brake drum, a cam sleeve mounted on the brake drum and formed with a Y-shaped cam groove, the coil spring brake having one end fixed to the cam sleeve and the other end disposed under the bottom part of the Y-shaped cam groove, and a cam casing integrally mounted in the tube and provided with a cam pin for engagement with the cam groove. The cam pin relatively moves along the cam groove and pushes either of the opposite ends to loosen the coil spring brake when the screen is drawn and when it is released after drawn from a position except the uppermost position and fasten the same on the brake drum when it is released after drawn from the uppermost position.

7 Claims, 9 Drawing Figures

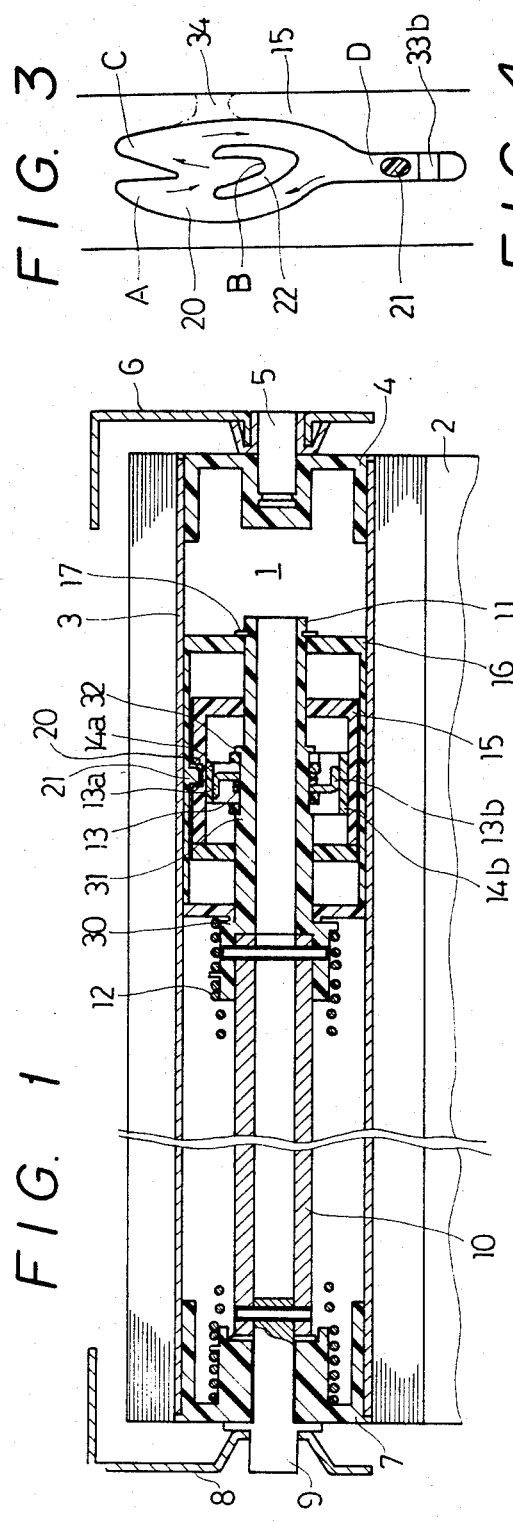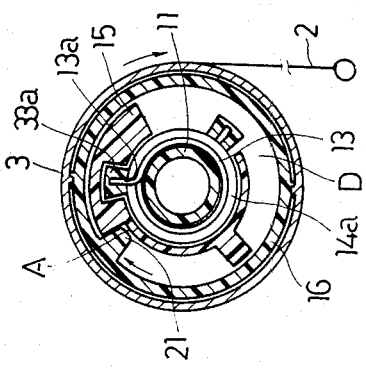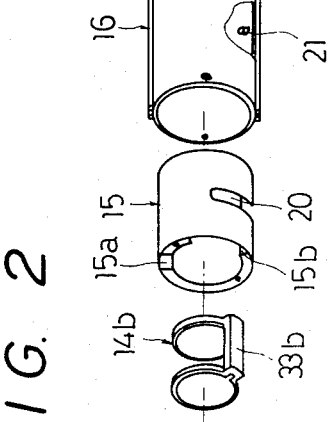

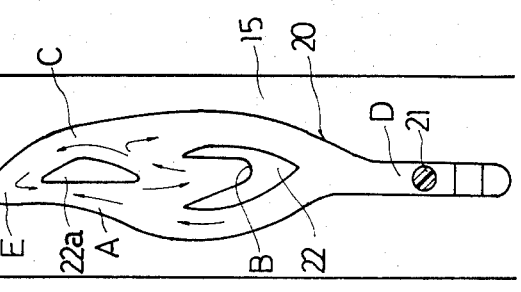
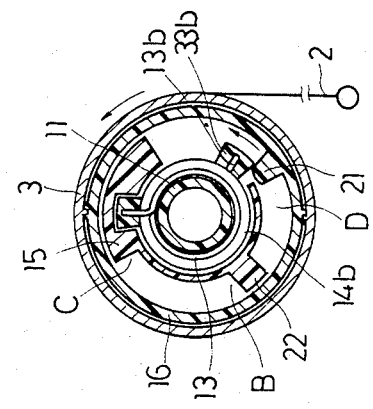
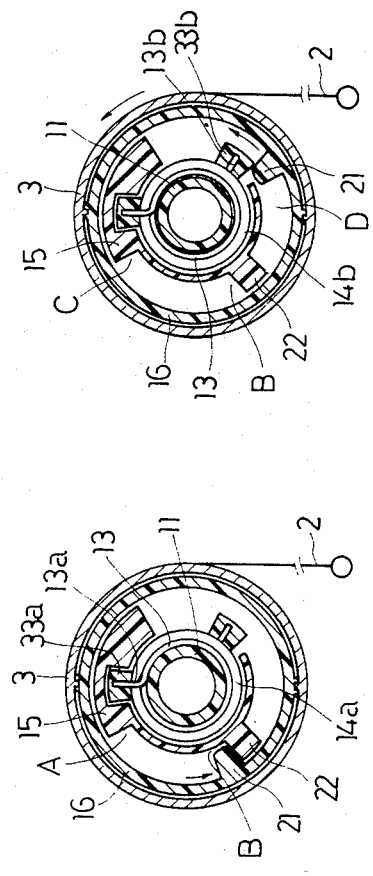
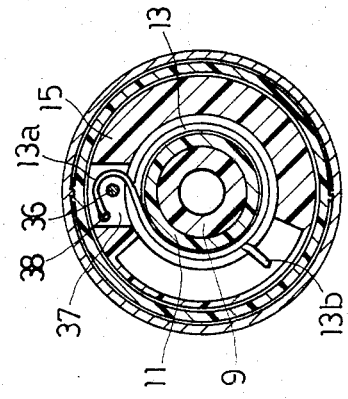
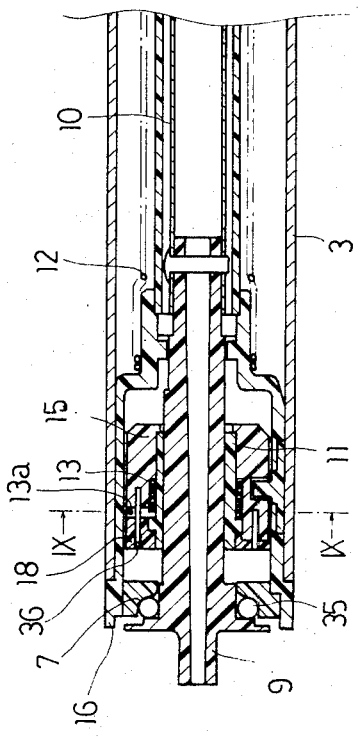

BRAKING DEVICE FOR USE IN A ROLLER BLIND

BACKGROUND AND SUMMARY OF THE INVENTION

The invention relates to a braking device for use in a roller blind of the type having a spring-motor to wind up a screen on a tube and, more particularly, to a novel device for braking and releasing the rotation of the tube irrespective of the rotary speed of the tube.

A roller blind has both brackets, a fixed shaft secured to one of the both brackets, a tube having an end fitted on the fixed shaft with the intervention of a braking device and the other end rotatably supported by the other bracket, a screen wound on the tube, and a spring-motor interposed between the tube and the fixed shaft for winding the screen on the tube. The known braking device comprises a centrifugal clutch having detents, pins or balls as a centrifugal member and depends on the rotary speed of the tube. The centrifugal clutch never actuates the braking device unless the tube rotates to roll up the screen at such low speeds that a centrifugal force is too small to prevent the centrifugal members from engaging. On the contrary, it never releases the device unless the tube rotates at such high speeds that a centrifugal force is large enough to prevent the centrifugal members from engaging.

This leads to a disadvantage that the known braking device requires a little knack to be operated. The screen can not stop at a position below the uppermost position without receiving a somewhat delicate finger-resistance to reduce the winding speed and actuate the braking device, when it is released to be rolled up by the spring-motor after being pulled below the aforementioned position. The screen can not be wound up from any position below the uppermost position without being released immediately after it is rapidly pulled down to release the braking device. The trouble is that the braking device is not easy to be disengaged if it is easy to be engaged, and vice versa.

The invention provides a novel braking device having no centrifugal clutch, in order to avoid the disadvantages as caused by a centrifugal force. In accordance with the invention, for use with a roller blind of the type having both brackets, a fixed shaft non-rotatably supported by one of the both brackets, a tube having an end fitted on the fixed shaft and the other end rotatably supported by the other bracket, a screen wound on the tube, and a spring-motor interposed between the tube and the fixed shaft. The device comprises a brake drum non-rotatably mounted on the fixed shaft, a coil spring brake mounted on the brake drum, a cam mechanism interposed between the coil spring brake and the tube so as to loosen the coil spring brake when the screen is drawn and when it is released after drawn from any position except the uppermost position and tighten the coil spring brake on the brake drum when the screen is released after drawn from the uppermost position. The cam mechanism consists of a cam sleeve mounted on the brake drum and formed with a cam groove and a cam casing integrally mounted in the tube and provided with a cam pin for engagement with the cam groove. The cam groove is generally Y-shaped and centrally provided with a V-shaped land to form twin top inlets, a central inlet and a bottom inlet. The coil spring brake has one end thereof secured to the cam sleeve and the other end disposed under the bottom inlet of the Y-shaped groove. Whenever the screen is pulled down to a position from the uppermost position, the cam pin moves from the bottom inlet to one of the twin top inlets to push the one end of the coil spring brake with the intervention of the cam sleeve in the direction in which the coil spring brake loosens, resulting in that the tube rotates to pay out the screen. When the screen is released at the aforementioned position, the cam pin moves from the top inlet to the central inlet to push the one end of the coil spring brake in the direction in which the coil spring brake tightens on the brake drum with the result that the screen stops at the position. When the screen is released after drawn from the position, the cam pin moves from the central inlet to the bottom inlet through the other top inlet to push the other end of the coil spring brake in the direction in which the coil spring brake loosens, so that the screen is raised to the uppermost position by the spring-motor. If the Y-shaped groove is modified to have a common V-shaped inlet and an additional land replaced for the twin top inlets. The cam pin turns about the additional land and returns to the central inlet when the screen is released after drawn from a position by a length beyond a preselected distance, resulting in that the screen is gradually payed out from a position to another position. However, the cam pin moves from the central inlet to the bottom inlet when the screen is released after drawn by a length within the preselected distance.

It is a main object of the invention to provide a braking device that is easily operated irrespective of the winding speed of the tube.

It is a further object of the invention to provide a braking device by which the screen is stopped at any position with ease.

It is a still further object of the invention to provide a braking device by which the screen is gradually payed out from a position to another position, if desired.

The invention is described in detail below with reference to drawings which illustrate only few preferred embodiments, in which:

FIG. 1 is a sectional view of the roller blind equipped with the braking device of the invention;

FIG. 2 is an exploded view of part of the braking device;

FIG. 3 is a developed view of the cam groove;

FIG. 4 is a somewhat enlarged cross-section of the blind of FIG. 1 illustrating the device in the state of releasement in which the screen is pulled down from the uppermost position;

FIG. 5 is a view similar to FIG. 4 illustrating the device in the braking state in which the screen is stopped at a position;

FIG. 6 is a cross-section somewhat apart from that of FIG. 4 illustrating the device in the other state of releasement in which the screen is wound up;

FIG. 7 is a view similar to FIG. 3 illustrating a modified cam groove;

FIG. 8 is a view similar to FIG. 1 illustrating another embodiment; and

FIG. 9 is a somewhat enlarged section taken along the line IX—IX in FIG. 8.

Referring now to the drawings wherein like parts are indicated by like reference numerals and initially to FIG. 1, there is illustrated therein a spring-motor type roller blind 1 which has a tube 3, a screen 2 wound on the tube 3, a couple of end caps 4, 7 fixed to the tube 3, a pair of brackets 6, 8. A round pin 5 is secured to the cap 4 and rotatably fitted in the bracket 6 and an angular pin 9 is fixedly supported by the bracket 8. The angular pin 9 passes through the cap 7 to join with an axial shaft 10, which is connected to a brake drum 11. A spring-motor 12 is loosely fitted on the axial shaft 10 and has the opposite ends respectively secured to the cap 7 and the brake drum 11. As the screen 2 is drawn out, the spring-motor 12 is twisted to reserve a resilent energy for winding up the screen. A coil spring brake 13 is fitted on the brake drum 11 and provided with the opposite ends 13a and 13b, which outwardly project to engage the respective rings 14a, 14b over the coil spring brake 13. Though the both ends 13a and 13b are not diametrically disposed, they are shown so for clarification in FIG. 1. A cam sleeve 15 is fitted on the rings 14a and 14b and mounted within a cam casing 16, which is integrally mounted within the tube 3 for rotation therewith and axially retained between the end shoulder 30 of the brake drum 11 and a snap ring 17. The coil spring brake 13 and the both rings 14a, 14b are disposed between the middle shoulder 31 and the annular projection 32 of the brake drum 11. The cam casing 16 has a cam pin 21 fitted in the cam groove 20 in the cam sleeve 15.

As seen in FIG. 2, the rings 14a and 14b are formed with the respective grooved projections 33a and 33b in which the ends 13a, 13b of the coil spring brake 13 are to be respectively inserted. The projection 33a is to be closely fitted in a narrow groove 15a of the cam sleeve 15 for rotation therewith, and the projection 33b is to be loosely retained within a wide groove 15b. The cam sleeve 15 is peripherally formed with the cam groove 20 for engagement with the cam pin 21 removably fixed to the cam casing 16. The cam casing 16 is to be peripherally splined to couple with the tube 3 as one body. The cam sleeve 15 and the cam casing 16 are to be covered with the respective front disks 18, and 19. The snap ring 17 is to be fitted on the end of the brake drum 11.

As seen in FIG. 3, the cam groove 20 in the cam sleeve 15 is generally Y-shaped to form twin top inlets A and C and a bottom inlet D and centrally provided with a V-shaped land 22 forming a central inlet B. With respect to the cam sleeve 15, the cam pin 21 moves along the Y-shaped groove 20 in the direction of the arrows and drops into the inlets A, B, C, and D by turns. The grooved projection 33b peeps out from the inlet D. The cam groove 20 is desirably provided with an entrance 34 as shown by dotted lines, so that the cam pin 21 is easily put in the cam groove 20 when the cam casing is assembled with the brake drum.

The operation of the device described above is best seen in FIGS. 4 to 6. As seen in FIG. 4, when the screen 2 is pulled down in the direction of the arrow, the tube 3 rotates together with the cam casing 16 of which the cam pin 21 moves from inlet D to inlet A to push the one end 13a of the coil spring brake 13 with the intervention of the cam sleeve 15 and the grooved projection 33a of the ring 14a in the direction of the arrow, so that the coil spring brake 13 is loosened to rotate about the brake drum 11 together with the cam sleeve 15, the cam casing 16 and the tube 3, resuling in that the screen 2 is freely drawn out.

As seen in FIG. 5, when the screen 2 is pulled down to a position from the uppermost position and then released, the rotation of the tube 3 is instantly inversed by the spring-motor 12 of FIG. 1. Therefore, the cam pin 21 is removed from inlet A to inlet B in V-shaped land 22 to push the end 13a of the coil spring brake 13 with the intervention of the cam sleeve 15 and the grooved projection 33a of ring 14a in the direction of the arrow. As the end 13a is pushed in the direction of the arrow of FIG. 5, the coil spring brake 13 is tightened on the brake drum 11 to prevent the rotation of the cam sleeve 15, the cam casing 16 and the tube 3, as one body, and stop the drawn screen at the aforementioned position.

As seen in FIG. 6, when the screen 2 is slightly pulled down from the aforementioned position and then released, the cam pin 21 once shifts to inlet C from inlet B in the V-shaped land 22 and then returns to inlet D to push the end 13b with the intervention of the grooved projection 33b of ring 14b in the direction of the arrow in which the coil spring brake 13 is unfastened, resulting in that the spring-motor 12 of FIG. 1 rotates the cam sleeve 15, the cam casing 16 and the tube 3, as one body, about the brake drum 11 in the direction of the arrow to wind up the screen 2 to the uppermost position.

As seen in FIG. 7, the cam groove 20 in the cam sleeve 15 can be modified to have the twin top inlets A and C elongated upwardly to form a common V-shaped inlet E and an additional land 22a. The cam pin 21 is guided in the direction of the arrows as follows: it moves from inlet D to inlet E to loose the coil spring brake when the screen is pulled down from the uppermost position and removes from inlet E to inlet B in V-shaped land 22 to fasten the coil spring brake on the brake drum when the screen is released after pulled down to a position from the uppermost position. Thereafter, it moves in two ways. If the screen is released after pulled down from the aforementioned position by a length within a preselected distance, it once removes to inlet C and then returns to inlet D to loosen the coil spring brake and permit the screen to be wound up to the uppermost position. However, if the screen is pulled down from the position by a length beyond the preselected distance, it returns to inlet E to fasten the coil spring on the brake drum with the result that the screen stops at another position spaced apart from the aforementioned position. It will be appreciated that the screen is payed out from a position to another position with ease.

FIGS. 8 and 9 show another embodiment of the invention which comprises the brake drum 11 slidably mounted on the fixed shaft 9. As seen in FIG. 8, the cam sleeve 15 embracing the coil spring brake 13 together with the cover 18. The cam sleeve 15 and the coil spring brake 13 are integrally slidable with the brake drum 11. The spring-motor 12 is interposed between the cam casing 16 and a non-illustrated ring secured to the inner end of the axial shaft 10 which has the outer end fixed to the inner end of the fixed shaft 9. The cam casing 16 is fixed to the end part of the tube 3 and covered with end cap 7, which is rotatably supported by the fixed shaft 9 with the intervention of balls 35. The coil spring brake 13 has one end 13a thereof wound about a pin 36 for interconnection between the cover 18 and the cam sleeve 15.

As best seen in FIG. 9, the one end 13a extends tangentially from the coil spring brake 13 and turns about the pin 36 in the void space 37 prior to entering in a loose hole 38 in the side of the cam sleeve 15. The other end 13b of the coil spring brake 13 is disposed without covering under the bottom inlet of the cam groove. Although no shock is given to either of the opposite ends 13a and 13b when the coil spring brake is unfastened, the cam sleeve 15 gives a shock to the one end 13a when the coil spring brake is fastened on the brake drum 11. It will be appreciated that the shock gives no damage to the one end 13a because it is tangential to the coil spring brake 13 and well absorbed by the wire forming the coil spring brake 13.

What is claimed is:

1. A braking device for use in a roller blind of the type having two backets, a fixed shaft non-rotatably supported by one of the two brackets, a tube having an end thereof fitted on the fixed shaft and the other end rotatably supported by the other bracket, a screen wound on the tube, and a spring-motor interposed between the fixed shaft and the tube, said braking device comprising a brake drum non-rotatably supported by the fixed shaft, a coil spring brake mounted on said brake drum, a cam casing integrally fitted in the tube, a cam sleeve mounted on said coil spring brake formed with a cam groove, said coil spring brake having one end thereof connected to said cam sleeve and the other end disposed along said cam groove, said cam groove being Y-shaped and centrally formed with a V-shaped land to form twin top inlets, a central inlet and a bottom inlet, whereby said cam pin moves from said bottom inlet to one of said twin top inlets to loosen said coil spring brake when the screen is pulled down to a first position from the uppermost position, removes from said top inlet to said central inlet to fasten said coil spring brake on said brake drum when the screen is released at said first position, and returns from said central inlet through said other top inlet to said bottom inlet to loosen said coil spring brake when the screen is released after pulled down from said first position.

2. A braking device as claimed in claim 1, wherein said twin top inlets extends upwardly to form a common V-shaped inlet and an additional land, whereby said cam pin turns about said additional land from and to said central inlet when the screen is released after pulled down from said first position by a length beyond a preselected distance and moves to said bottom inlet when the screen is released after pulled down from said first position by a length within the preselected distance.

3. A braking device as claimed in claim 1, wherein said cam groove is formed with an entarance through which said cam pin is inserted into said cam groove.

4. A braking device as claimed in claim 1, wherein said brake drum is secured to the fixed shaft.

5. A braking device as claimed in claim 4, wherein both rings are rotatably mounted on said brake drum, each ring having a grooved projection connected to either of said ends.

6. A braking device as claimed in claim 1, wherein said brake drum is slidably mounted on the fixed shaft.

7. A braking device as claimed in claim 6, wherein said cam sleeve is covered with a cover through the intermediary of a pin to form a void space between said cam sleeve and said cover, said one end extending tangentially from said coil spring brake and turning about said pin prior to entering a loose hole in said cam sleeve.

* * * * *